UNITED STATES PATENT OFFICE.

WILLIAM H. PERKIN, OF SUDBURY, ENGLAND.

IMPROVEMENT IN THE MANUFACTURE OF COLORING MATTERS FROM ANTHRACENE.

Specification forming part of Letters Patent No. 127,426, dated June 4, 1872.

*To all whom it may concern:*

Be it known that I, WILLIAM HENRY PERKIN, of Sudbury, in the county of Middlesex, England, a subject of the Queen of Great Britain, have invented or discovered new and useful "Improvements in the Manufacture of Coloring Matter suitable for Dyeing and Printing;" and I, the said WILLIAM HENRY PERKIN, do hereby declare the nature of the said invention, and in what manner the same is to be performed, to be particularly described and ascertained in and by the following statement thereof—that is to say:

This invention has for its object improvements in the manufacture of coloring matter suitable for dyeing and printing. For this purpose I treat chlorinated anthracene with sulphuric acid, and I oxidize the product by means of a suitable oxidizing agent. I then further treat the solution with caustic alkali and otherwise, as is hereinafter fully described, and so obtain coloring matter.

Brominated anthracene may be used in place of chlorinated anthracene; or I may use anthracene which is both chlorinated and brominated.

In place of using an oxidizing agent in the manner above stated, the chlorinated anthracene or other anthracene compound above set forth may be heated somewhat strongly with the sulphuric acid, and the process completed as before, but with the omission of the use of the oxidizing agent after the treatment with sulphuric acid.

In order that my said invention may be most fully understood and readily carried into effect, I will proceed to describe more in detail the manner in which I prefer to conduct the manufacture.

I take commercial anthracene more or less impure, and by heavy pressure separate, for the most part, the oily impurities. I then dissolve the anthracene in benzole, and crystallize it therefrom; or in place of benzole I employ coal-tar naphtha. I obtain chlorinated anthracene by the action of chlorine upon anthracene thus purified. I proceed as follows: Anthracene in fine powder is spread out in thin layers—say of half an inch or less in thickness—on trays of lead or other suitable material, and placed in a chamber which is afterward supplied with chlorine gas. The treatment with chlorine is continued for about twenty-four hours, in which time the anthracene will, for the most part, have become chlorinated.

The crude product may at once be employed for the manufacture of coloring matter, but, in preference, it is first dissolved in benzole and crystallized therefrom. This process succeeds well at a temperature of from 18° to 21° centigrade. The anthracene may be further chlorinated, but no additional advantage is thereby obtained, and hence it is not recommended; but I may mention that if the chlorinating process be continued for a considerably longer time more chlorine will be absorbed, and products produced containing chlorine in larger proportion. This operation may be assisted by heat.

Another method of chlorinating anthracene, which gives more uniform results with samples of anthracene, varying in their degrees of purity, is as follows: I take anthracene in powder and mix it with benzole in the proportions of about one part by weight of anthracene and four or five parts by weight of benzole, and pass chlorine through the mixture until it becomes a crystalline paste, owing to the formation of chlorinated anthracene. This chlorinated anthracene is then collected on a filter, and, when well drained, freed from adhering benzole by evaporation or otherwise.

My practice is to take one part of crystallized chlorinated anthracene and mix it with four or five parts of sulphuric acid, either ordinary concentrated acid or fuming. The mixture is then heated gradually up to 130° or 150° centigrade, or until the product, when well mixed with boiling water, dissolves. When using fuming acid it is not necessary to heat the mixture to the same extent. The product is then diluted with three or four times its bulk of water, and binoxide of manganese added in excess, and the whole well boiled until a portion of the solution, when diluted, does not appear fluorescent, as it did before treatment with the binoxide of manganese. It is then poured off from any binoxide of manganese that is left undissolved, and caustic lime, in the form of milk of lime, added in slight excess, or until the solution is alkaline.

It is then boiled and filtered, and the residue repeatedly washed with water. The filtrate is then concentrated, and, by preference, carbonate of potash or soda added until carbonate of lime is no longer precipitated. It is then filtered off from the precipitate and evaporated to dryness. This product is then mixed with about twice its weight of caustic potash or soda, or a mixture of these dissolved in a small quantity of water, and gradually heated up to about 180° or 210° centigrade, or until a portion, when withdrawn and dissolved in water, gives a copious yellow precipitate upon the addition of hydrochloric acid. The product is then dissolved in water acidulated with sulphuric, hydrochloric, or other suitable acid, and then thrown on a filter, and the precipitate washed until neutral or nearly so. This product may be used for dying and printing in the same manner as preparations of madder. The coloring matter contained in the yellow filtrate may be precipitated by neutralizing the solution with carbonate of soda and allowing it to stand, when it will principally settle down as a dark-colored precipitate, which can be collected upon a filter or otherwise, and may be used for the preparation of pigments by precipitating its solution with alumina, baryta, or base by usual methods, thus forming pigments or cakes. If it be desired to obtain more soluble coloring matter as the chief product, the heating with caustic alkali should occupy a shorter time, or the amount of alkali used should be less—say by one half. On the other hand, if the more soluble coloring matter has been obtained by mistake, it may be converted into the less soluble by a second treatment with caustic alkali.

Caustic baryta or strontia may be used instead of caustic potash or caustic soda, with more or less success.

Other oxidizing agents may be used in place of binoxide of manganese, such as binoxide of lead or nitric acid.

Milk of lime is employed, by preference, to separate the sulphuric acid and precipitate the oxide of manganese held in solution; but other products, such as baryta, may be employed; or when manganese or similar agent is not used carbonate of lime or baryta can be employed.

Sometimes, instead of diluting the products of the action of sulphuric acid upon the chlorinate anthracene, I elevate the temperature gradually to 210° centigrade, and keep the substance heated to about this point until a portion of the product, when diluted with water, is no longer fluorescent. The product may then at once be neutralized with milk of lime filtered and heated, as already described.

When working in this manner it is better to use the fuming sulphuric acid, but for the first process the ordinary strong acid works well.

As already mentioned, brominated anthracene may be used in place of chlorinated anthracene, as may also anthracene which is both chlorinated and brominated. I do not recommend the use of these substances, on account of their greater expense, but they can be prepared as follows:

The brominated anthracene may be prepared by submitting finely-powdered anthracene, purified in the manner which I have described, in thin layers, to the action of bromine vapor for about twenty-four hours. I can employ the product in this condition, or, by preference, after crystallization from benzole. By prolonging the treatment of anthracene with bromine, or subjecting the crystallized product to the action of bromine, the anthracene can be made to take up a further quantity of bromine; but no advantage is thus attained, and in the subsequent working the test by fluorescents will be found less available. The same I find to be the case when working with anthracene which (for my purpose) is over-chlorinated.

Anthracene, both chlorinated and brominated, may be obtained by exposing chlorinated anthracene to the action of bromine vapors, or by heating brominated anthracene suspended in benzole with chlorine gas.

Coloring matter may be prepared from any of these substances in the manner described in respect to chlorinated anthracene.

The process above described is advantageous, among other reasons, because the excess of acid left in the solution after the heating of the brominated or chlorinated anthracene with sulphuric acid may be separated readily by the action of lime or baryta, which forms, practically, insoluble precipitates with that acid, thus obviating the necessity of distilling off the excess of acid, as is practiced when brominated anthracene is treated with nitric acid. The sulphuric-acid process, moreover, is less costly than the nitric-acid process, on account of the less cost of the former acid.

I am aware that anthracene has been treated with sulphuric acid as a substitute for treatment with chlorine or with bromine, in which case sulphuric acid is applied directly to anthracene or anthrakinon; but I do not claim such direct treatment with sulphuric acid.

I claim—

Treating chlorinated anthracene or brominated anthracene, or partly-chlorinated and partly-brominated anthracene with sulphuric acid, producing therefrom coloring matter suitable for dyeing and printing purposes, in the manner hereinbefore described.

WILLIAM H. PERKIN.

Witnesses:
 WILMER M. HARRIS,
 THOMAS LAKE.